United States Patent [19]

Schülde et al.

[11] 4,346,204
[45] Aug. 24, 1982

[54] COPOLYMERS CONTAINING HYDROXYL GROUPS, METHOD OF PRODUCTION AND THEIR APPLICATION IN SIZING OF PAPER

[75] Inventors: Felix Schülde, Wulfen; Karl Peterlein; Klaus Diedrich, both of Gladbeck, all of Fed. Rep. of Germany

[73] Assignee: C Hemische Werke Hüls Aktiengesellschaft, Marl, Fed. Rep. of Germany

[21] Appl. No.: 121,507

[22] Filed: Feb. 14, 1980

[30] Foreign Application Priority Data

Feb. 15, 1979 [DE] Fed. Rep. of Germany ....... 2905764

[51] Int. Cl.³ .......................... C08L 3/02; C08F 22/06
[52] U.S. Cl. ..................................... 526/271; 526/272
[58] Field of Search .......................................... 526/271

[56] References Cited

U.S. PATENT DOCUMENTS 3,953,407  4/1976  Hayoshi et al. ..................... 526/271
3,957,736  5/1976  Tsuchiya et al. ................... 526/271
4,200,559  4/1980  Peterlein et al. ............. 260/17.4 ST Primary Examiner—William F. Hamrock
Assistant Examiner—Peter F. Kulkosky
Attorney, Agent, or Firm—Oblon, Fisher, Spivak, McClelland & Maier

[57] ABSTRACT

A copolymer derived from maleic anhydride and dicyclopentadiene, containing hydroxyl groups, having the formula:

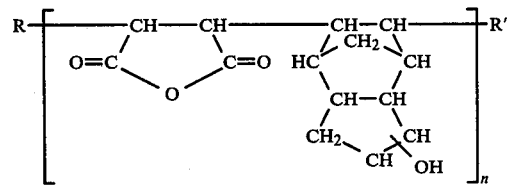

wherein R and R' may be the same or different, selected from the group consisting of H, $C_1$–$C_{14}$ alkyl-isobutyronitrile, phenyl which is optionally substituted by halogen, $C_1$–$C_8$ alkyl-substituted phenyl, $C_1$–$C_{14}$ alkoxy-, $C_1$–$C_{14}$ acyloxy- or halogen-substituted benzoyl, and n=3–10. The copolymer is useful for the sizing of paper.

9 Claims, No Drawings

COPOLYMERS CONTAINING HYDROXYL GROUPS, METHOD OF PRODUCTION AND THEIR APPLICATION IN SIZING OF PAPER

BACKGROUND OF THE INVENTION

1. Field of the Invention

The present invention relates to hydroxy-containing copolymers of dicyclopentadiene and maleic anhydride, useful for the sizing of paper.

2. Description of the Prior Art

U.S. Pat. No. 3,188,303 contains a description of products which are created during the transformation of α,β-unsaturated di- and tricarboxylic acids, and maleic anhydride in particular, with dicyclopentadiene, at temperatures below 115° C., in the presence of radical initiators in an inert solution. The temperature is limited to about 115° C. in order to prevent a dedimerization of dicyclopentadiene into cyclopentadiene, with a subsequent Diels-Alder-reaction between cyclopentadiene and maleic anhydride. Aromatic or aliphatic hydrocarbons, respectively, such as, for instance, benzene, toluene, xylene, hexane, heptane or excess dicyclopentadiene may serve as solvent. Aside from these solvents, ethers such as dioxane or ketones may be used, but the reaction product must then first be precipitated by means of a hydrocarbon.

Compounds of the group of organic peroxides, hydroperoxides, oximes, nitriles, azo-aromatic and diazo-aromatic compounds may be used as radical initiators, as long as they have a sufficiently high speed of decomposition below the given reaction temperature, in order to start and maintain the reaction.

As the preferred radical initiators have been mentioned azobisisobutyronitrile, laurylperoxide, benzoylperoxide, 1-azocyclohexanecarbonitrile as well as t-butylperbenzoate.

The products resulting from the reaction are brittle powders which do not melt up to a temperature of 300° C., and begin to decompose above this temperature. In this, they are clearly different from products created by a Diels-Alder-reaction between cyclopentadiene and maleic anhydride, and which melt in a temperature range between 30° C. and clearly below 300° C.

In addition, German Disclosure No. 2,727,510 describes the use of water-soluble ammonium salts of such copolymers from dicyclopentadiene and maleic anhydride as a material for the sizing of paper. Use of these synthetic paper sizings for surface treatment of paper permits their application without the addition of metallic salts. The copolymers listed there have the advantage over such other copolymers made from unsaturated carboxylic acids and ethylene-unsaturated compounds which are used for the sizing of paper, in that they may be used directly as copolymers or salts of copolymers, respectively, without having to be transformed into derivatives, such as semi-amides, imides, semi-esters, etc. The obtained values of efficiency are very good. The disadvantage of these copolymers mentioned in DE-OS No. 2,727,510, made of dicyclopentadiene and maleic anhydride lies in their anti-solubility in alkaline solutions (below 5%). They must, therefore be dissolved in aqueous ammonia solutions. After that, their possibilities for application become limited, wherever for reasons of production technology or physiology the use of ammonia is prohibited.

SUMMARY OF THE INVENTION

In the current invention, copolymers containing hydroxyl-groups, on the basis of dicyclopentadiene and maleic anhydride, as well as a process for their production are described. These copolymers may be used for the sizing of paper surfaces and do not have the above-described disadvantages.

The copolymers containing hydroxyl-groups of the invention are obtained by adding water to copolymers of maleic anhydride and dicyclopentadiene. It was surprising to find that the addition of water to the greatest extent takes place at the double bond existing in the dicyclopentadiene radicals of the copolymer, and only a very minor portion of the anhydride group is saponified.

Therefore, copolymers containing hydroxyl groups from maleic anhydride and dicyclopentadiene of the general formula

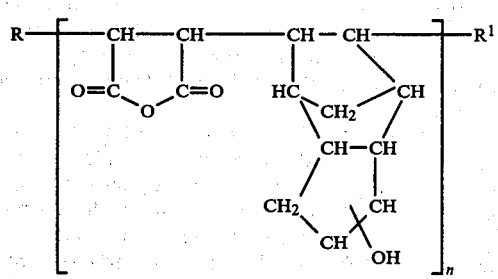

are the object of the invention, wherein R and $R^1$ may be the same or different, selected from the group of H, $C_1$-$C_{14}$ alkyl-isobutyronitrile, phenyl optionally substituted by halogen, $C_1$-$C_8$ alkyl-substituted phenyl-, $C_1$-$C_{14}$ alkoxy-, $C_1$-$C_{14}$ acyloxy- or halogen substituted benzoyl; and $n=3$-$10$.

It is the further object of the invention to provide a method for the production of copolymers containing hydroxyl groups, from maleic anhydride and dicyclopentadiene according to claim 1, wherein a copolymer of maleic anhydride and dicyclopentadiene produced at temperatures below 115° C., in the presence of radical initiators in inert solvents, is reacted together with excess water or with an aqueous solution of sulphuric acid, during 1–10 hours, at temperatures of 70°–110° C., whereby the water preponderantly attaches to the double bond of the dicyclopentadienyl radical.

An additional object of the invention is the use of the copolymers containing hydroxyl groups of maleic anhydride and dicyclopentadiene according to claim 1, in anionic sizing for the surface of paper.

DESCRIPTION OF THE PREFERRED EMBODIMENTS

The end groups R and $R^1$ are derived either from the solvents used during the production of the copolymers from dicyclopentadiene and maleic anhydride, such as, for instance, benzene, toluene, xylene, heptane and hexane; or they are cleavage products of the initiators used in each case, such as benzoyl peroxide, azobisisobutyronitrile, lauryl peroxide, t-butylperbenzoate or diisopropylperoxidicarbonate.

In order to attach water to the double bond of the dicyclopentadienyl radical, the original copolymers, which have an average molecular weight of about 700 to 2500, are heated for some time in a 25% aqueous solution of sulphuric acid, or in excess water. The attachment of water in sulphuric acid is faster than in pure water; acidification, however, is in principle not required. During the course of the reaction, the groups of maleic acid anhydride contained in the original copolymer saponify only to a small extent to carboxyl groups, while to a far greater extent the water attaches to the double bonds present in the dicyclopentadiene radical, as can be seen from the infra-red spectra of the original, or the copolymers of the invention respectively. In the infra-red spectra of the original polymers can be found, at 3040 cm$^{-1}$, 1630 cm$^{-1}$ and 740 cm$^{-1}$, bands of the double bond of the dicyclopentadiene radical. Within the area between 1650 and 1900 cm$^{-1}$, there are only two strong bands at 1860 and 1780 cm$^{-1}$, for the groups of anhydrides. In the IR spectra of the copolymers of the invention, the double-bond bands are no longer present, the bands for the anhydride groups have remained, and at 3450 cm$^{-1}$ as well as at 1720 cm$^{-1}$ there are two bands for carboxyl groups which have been created during hydrolysis of some of the anhydride groups. It can be deduced from the intensity of these bands that less than 10% of the anhydride groups have been hydrolyzed.

In order to make the copolymers of the invention (which contain anhydride groups) soluble in water, they are transformed into their salts by means of bases. Experience has shown that not all of the carboxyl groups need to be neutralized, inasmuch as a degree of neutralization of 80%—relative to all carboxyl groups—is generally sufficient. Alkali-ions, such as sodium and potassium, as well as ammonia and/or mono-, di- or trialkyl ammonium with a total of up to 6 carbon atoms may preferably be used as cations. In addition, the copolymers of the invention may also be used in the form of their transformed products with ammonia or primary aliphatic or aromatic amines, as, for instance, ethylamine or aniline, or secondary amines, such as, for instance, diethylamine, morpholine or pyridine into the corresponding semi-amides. The products of such transformation also have excellent properties for the sizing of paper surfaces.

The amount of the copolymers of the invention needed for the sizing of paper is between 0.01 and 3, and preferably between 0.1 and 1 percent by weight, in relation to the weight of the paper.

The copolymers of the invention used as sizing for paper may be combined with the common anionic starches used for the sizing of paper. The sizing solutions obtained in this manner may be given the usual additives. Application may be done with the technologies common to paper manufacture.

EXAMPLE 1

100 g copolymer from maleic anhydride and dicyclopentadiene are heated while being refluxed in 400 g 25% aqueous solution of sulphuric acid for three hours. Subsequently, the copolymer is filtered and is thoroughly washed in water and dried. The obtained powder has a softening point of more than 300° C. This product permits the manufacture of alkaline solutions of 20–25%.

EXAMPLE 2

100 g copolymer from maleic anhydride and dicyclopentadiene are heated in 400 g water for eight hours, being refluxed. Subsequently, the copolymer is filtered and dried. The obtained white powder has a softening point of above 300° C. By means of an alkaline solution, 20 to 25% watery solutions can be made with this product.

EXAMPLE 3

The copolymer produced in accordance with Example 1 or Example 2 is dissolved in acetone. In order to transform it into a semi-amide, ammonia is introduced into the obtained solution. During transformation, the semi-amide is precipitated as a white powder. After drying, its softening point is above 300° C.

The copolymers obtained in accordance with Examples 1, 2 and 3, and—for the purpose of comparison—a copolymer which has not been treated additionally, but which has been made of maleic anhydride and dicyclopentadiene, are combined with an oxidized corn starch to a 10% sizing bath. For this purpose, the copolymers are dissolved in an aqueous ammonia solution (=sizing Ia, IIa, IIIa and IVa). In addition, the copolymers obtained as in Example 1 and Example 2 are dissolved in a hydrogen carbonate solution and a 10% sizing bath is produced (=sizing Ib, IIb). The untreated comparative copolymer from dicyclopentadiene and maleic anhydride dissolves only to about 0.3% in a hydrogen carbon solution and, therefore, cannot be used for the production of a sizing bath using NaOH. The solid-matter relation between sizing and starch is 1.5:8.5. These sizing baths with a pH value of about 9 (sizings Ia–IVa), or about 11, respectively, (sizings Ib, IIb), are applied to an unsized, wood-free 80 g paper by means of a laboratory size press, so that the applied amount of sizing (as solid matter) is about 0.6% of the weight of the paper. The characteristics of the tried paper can be seen in Table 1.

TABLE 1

| Sizing | Ia | Ib | IIa | IIb | IIIa | IVa | without |
|---|---|---|---|---|---|---|---|
| Water absorption DIN 53132 sec/g/m$^2$ | 10/12 | 10/17 | 10/13 | 10/17 | 10/12 | 10/16 | 1/89 |
| Degree of sizing DIN 53145 sec | 1800 | 1800 | 1800 | 1800 | 1800 | 1800 | 1 |
| Capillary rise of water 10 min DIN 53 106 mm | 1–2 | 2–3 | 2–4 | 2–3 | 2–3 | 3–4 | 44 |
| Surface bonding strength (Dennison Test) | 20 | 20–18 | 20–18 | 20–18 | 20 | 18 | 11 |

Analogous to the above examples, the sizings I–IV were formulated to make a sizing bath and were applied by means of a size-press, with the only difference that paper pre-sized by a content of 0.4% resin size within the mass was being used. The characteristics of this paper can be seen from Table 2.

TABLE 2

| Sizing | Ia | Ib | IIa | IIb | IIIa | IVa | without |
|---|---|---|---|---|---|---|---|
| Water absorption DIN 53 132 sec/g/m² | 60/11 | 60/14 | 60/14 | 60/12 | 60/12 | 60/12 | 60/27 |
| Degree of sizing DIN 53145 sec | 1800 | 1800 | 1800 | 1800 | 1800 | 1800 | 418 |
| Capillary rise of water 10 min DIN 53 106 mm | 1-2 | 1-2 | 1-2 | 1-2 | 1-2 | 1-2 | 1-2 |
| Surface bonding strength Dennison-Test | 20 | 20 | 20 | 20 | 20 | 18 | 13 |

The effectiveness of the copolymers of the invention for use as sizing is clearly evident.

What is new and intended to be covered by Letters Patent of the United States is:

1. A copolymer of maleic anhydride and dicyclopentadiene, having hydroxy groups, of the formula:

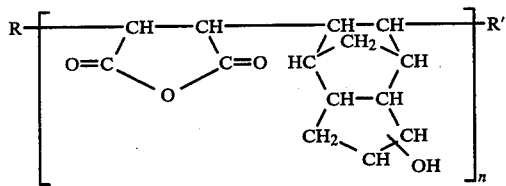

wherein R and R' may be the same or different radicals selected from the group consisting of hydrogen, $C_1$–$C_{14}$ alkyl-isobutyronitrile, unsubstituted phenyl or phenyl substituted by halogen or $C_1$–$C_8$ alkyl, $C_1$–$C_{14}$ alkoxy-substituted benzoyl, $C_1$–$C_{14}$ acyloxy-substituted benzoyl and halogen-substituted benzoyl, and n=3–10.

2. The copolymer of claim 1, wherein up to 100% of all maleic anhydride units are reacted with a base selected from the group consisting of alkali-metal bases, ammonia and mono-, di- or trialkyl amines.

3. The copolymer of claim 2, wherein the maleic anhydride units are reacted to an extent sufficient to render the final product water soluble.

4. A process for producing the copolymer of claim 1, which comprises:
   preparing a copolymer of maleic anhydride and dicyclopentadiene below 115° C. in inert solvents, in the presence of a radical initiator,
   reacting said copolymer with excess water or with an aqueous solution of sulphuric acid, for 1-10 hours at 70°–110° C., thereby
   adding water across the double bond of the dicyclopentadienyl radicals.

5. The process of claim 4, wherein said inert solvents are selected from the group consisting of benzene, toluene, xylene, heptane and hexane.

6. The process of claim 4, wherein said radical initiators are selected from the group consisting of benzoyl peroxide, azobisisobutyronitrile, lauryl peroxide, t-butylperbenzoate and diisopropylperoxidicarbonate.

7. The process of claim 4, wherein said aqueous solution of sulphuric acid is a 25% aqueous solution.

8. A method of sizing the surface of paper which comprises using as the sizing agent 0.01-3% by weight of the paper a copolymer of any of claims 1, 2 or 3.

9. The method of claim 8, wherein said copolymer is used together with anionic starch.

* * * * *